United States Patent [19]

Tsukamoto et al.

[11] Patent Number: 5,447,796
[45] Date of Patent: Sep. 5, 1995

[54] MAGNETIC RECORDING MEDIUM COMPRISING A SOLID LUBRICATION LAYER OF FULLERENE CARBON HAVING AN ALKYL OR ALLYL CHAIN

[75] Inventors: Yuji Tsukamoto; Takashi Fukuchi, both of Tokyo, Japan

[73] Assignee: NEC Corporation, Tokyo, Japan

[21] Appl. No.: 261,212

[22] Filed: Jun. 15, 1994

Related U.S. Application Data

[63] Continuation of Ser. No. 35,154, Mar. 22, 1993, abandoned.

[30] Foreign Application Priority Data

Mar. 25, 1992 [JP] Japan ................................. 4-66634

[51] Int. Cl.$^6$ ............................................... G11B 5/00
[52] U.S. Cl. .............................. 428/408; 428/694 TC; 428/900
[58] Field of Search .................. 428/694 TC, 408, 900

[56] References Cited

U.S. PATENT DOCUMENTS

| | | | |
|---|---|---|---|
| 4,503,125 | 3/1985 | Nelson et al. | 428/408 |
| 4,774,147 | 9/1988 | Kuse et al. | 428/323 |
| 4,804,590 | 2/1989 | Nakamura et al. | 428/408 |
| 4,891,114 | 1/1990 | Hitzfeld et al. | 204/192.15 |
| 5,045,165 | 9/1991 | Yamashita | 204/192.16 |

OTHER PUBLICATIONS

Curl et al. "Fullerenes" Scientific American Oct. 1991 p. 54+.
Edelson, Eward "Buckyball the magic molecule" Popular Science Aug. 1991 p. 52+.
Kroto, Harold "Space, Stars, $C_{60}$, and Sect" Science Nov. 1988 p. 1139+.
H. W. Kroto et al., "$C_{60}$: Buckminsterfullerene", Nature, vol. 318, Nov. 14, 1985, pp. 162-163.
H. W. Kroto et al., "The formation of quasi-icosahedral spiral shell carbon particles", Nature, vol. 331, Jan. 28, 1988, pp. 328-331.

Primary Examiner—Stevan A. Resan
Attorney, Agent, or Firm—Sughrue, Mion, Zinn, Macpeak & Seas

[57] ABSTRACT

A magnetic disk has a magnetic medium or a protection film, and a solid lubrication film formed on the medium or the protection film and consisting of a fullerene $C_{60}$, $C_{70}$ or $C_{84}$ and an alkyl or allyl-chained fullerene. The lubrication film provides the disk with high mechanical durability and high linear recording density.

4 Claims, 2 Drawing Sheets

MAGNETIC RECORDING MEDIUM COMPRISING A SOLID LUBRICATION LAYER OF FULLERENE CARBON HAVING AN ALKYL OR ALLYL CHAIN

This is a Continuation of Application No. 08/035,154 filed Mar. 22, 1993, now abandoned.

BACKGROUND OF THE INVENTION

The present invention relates to a magnetic recording medium implemented as a disk, drum, tape, etc.

There is an increasing demand for a magnetic disk drive or similar magnetic recording device having a smaller size and a greater capacity. To attain both the smaller size and the greater capacity, high recording density is the prerequisite. For this purpose, even a magnetic disk drive using a perpendicular magnetic recording system in place of the traditional longitudinal magnetic recording system has been reported. The key to high recording density is to reduce the gap between a magnetic head and a magnetic medium. Specifically, the vertical recording system cannot fully exhibit its inherent advantage unless a gap smaller than 0.1 $\mu$m is implemented. Of course, reducing the gap is also essential with the longitudinal magnetic recording system in enhancing high density recording. More specifically, reducing the the floating amount of a magnetic head slider and the thicknesses of magnetic medium and protection layer of a magnetic disk are the major technical issues in the magnetic recording art.

Basically, a magnetic disk using a thin film magnetic medium arid put to practice today has a 1 nm to 2 nm thick lubrication layer, a 30 nm to 50 nm thick protection layer, a 50 nm to 70 nm thick metallic magnetic medium, a 20 $\mu$m to 30 $\mu$m thick nonmagnetic NiP layer, and an Al alloy substrate. Typically, the lubrication layer is implemented by a liquid lubricant belonging to a group of organic fluorides, the protection layer is implemented by a carbon film or an $SiO_2$ film formed by sputtering, and the magnetic medium is implemented by a Co-based alloy thin film formed by sputtering or nonelectrolytic plating.

Conventional magnetic disks with the above-stated laminate structure have some problems left unsolved, as enumerated below.

(1) When a magnetic disk drive is brought to a stop, an attraction acts between the liquid lubricant and the head slider, tending to cause the slider to stick to the surface of the disk. In the light of this, it is a common practice to provide crevasse-like scratches called a texture on the surface of the disk. However, the texture not only increases the gap between the disk and the slider but also degrades reliability in the mechanical durability aspect.

(2) The liquid lubricant is apt to fly away due to the spinning disk (phenomenon called spin-off). Although the lubrication layer is provided with a thickness taking account of the spin-off of the lubricant, a thick lubrication layer aggravates the above drawback (1).

(3) The range of substances applicable to the protection film is extremely narrow since the spin-off characteristic and lubricating ability of the liquid lubricant depends on the bond between the lubricant and the surface of the protection layer. Particularly, a fluoric liquid lubricant which is predominant today provides molecules with bonding ability by a functional group and, therefore, does not surely bond to the carbon-based or oxide-based nonmagnetic protection layer.

Since the problems stated above stem from the fact that the lubricant is a liquid, the use of a solid lubricant is under study. However, a solid lubricant brings about other problems, as follows, When the disk starts and ends spinning, it causes a solid lubricant to come off by contacting the lubricant. Then, the particles of the lubricant would contaminate the inside of the device while degrading reliability. Moreover, a solid lubricant does not have a self-recovering ability available with a liquid lubricant. The self-recovering ability is such that a liquid lubricant becomes thin on the slider trace, but as the slider moves to another locus, the lubricant automatically gathers at the thin portion from around it. For these two reasons, the application of a solid lubricant to a magnetic disk has not progressed at all.

SUMMARY OF THE INVENTION

It is, therefore, an object of the present invention to provide a magnetic recording medium achieving high mechanical durability despited the use of a solid lubrication film.

In accordance with the present invention, a magnetic recording medium comprises a substrate and a magnetic medium, a protection film and a solid lubrication layer which are sequentially formed on the substrate in this order.

Also, in accordance with the present invention, a magnetic recording medium comprises a substrate and a magnetic medium and a solid lubrication layer which are sequentially formed on the substrate in this order.

Further, in accordance with the present invention, a magnetic recording medium comprises a substrate and a magnetic medium, a layer formed by oxidizing the surface of the magnetic medium by heat, and a solid lubrication layer comprising fullerene which are sequentially formed on the substrate in this order.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
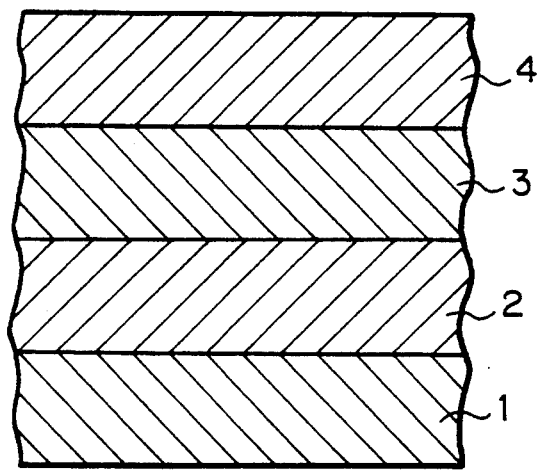
FIG. 1 is a fragmentary section showing a magnetic disk produced by any one of Embodiments 1–24 of the present invention.

To begin with, C60, C70 and C84, generally referred to as fullerenes, are spherical or oval hollow molecules having respectively sixty carbon atoms, seventy carbon atoms, and eighty-four carbon atoms. The diameter of fullerenes is about 1 nm. Fullerenes themselves are semiconductive and have some unique characteristics in the engineering aspect, e.g., it exhibits superconductivity when doped with potassium. Besides, in the mechanical aspect, although fullerenes are hollow and therefore have relatively small elastic coefficients, their molecules themselves have extremely high rupture strength. The high mechanical strength and the low elastic coefficient are prerequisites in achieving high wear resistivity and desirable friction characteristic, respectively. Furthermore, fullerenes are mechanically superstable and suffers from a minimum of chemical actions, e.g., oxidation and corrosion. Such unique mechanical properties and exceptional chemical stability provide fullerene-based substances with desirable characteristics when implemented as a protective lubrication layer included in a magnetic disk or similar magnetic recording medium.

How to produce C60, C79 or C84 is well known and therefore will not be described herein.

An alkyl-chained or allyl-chained fullerene was produced by the heat reflux of fullerene and halogenized allyl effected in an organic solvent. For example, when 720 mg (1 millimole) of C60 and C60 mg (10 moles) of 3-iodine propylalcohol are dissolved in 100 ml of benzen and then subjected to heat reflux at the boiling point for 10 hours, a propylalcohol additive of C60 is produced. Regarding the halogenized alkyl, use may be made of molecules represented by a formula:

$$I-C_nH_{2n}OH \text{ or } I-C_nH_{2n}-NH_2$$

The former formula turns out 3-iodine propylacohol when n is 3, while the latter formula turns out 1-amino-6-iodine hexane when n is 6. The halogenized allyl may be implemented as 1-phenyl-9-iodine hexane or 5-iodion heptanoic acid-2,4-diene. As to the solvent, benzene may be replaced with phenol, nitro benzene, viridin, etc.

In the following description let the propylalcohol additive, 1-amino hexane additive and 1-phenyl hexane additive of C60 be abbreviated as C60-AL, C60-AM and C60-PH, respectively.

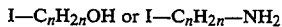

The fullerenes or the alkyl chain or allyl chain of fullerenes stated above are deposited on magnetic disks by evaporation to form films. If desired, the evaporation may be replaced with an ion cluster beam method or even with a spin coat method which dissolves a fullerene in benzene, phenol, nitrobenzene, viridin or similar solvent, applies the resulting solution to a magnetic disk by spin coating, and then dries the disk by heating the solvent. However, film forming methods exceeding the thermal decomposition temperature are not usable due to the limitations of fullerenes or the alkyl or allyl chain additives thereof as to the thermal decomposition temperature.

A specific procedure for fabricating a disk provided with a fullerene is as follows. A substrate was implemented as a glass disk having a diameter of 3.5 inches. A 200 nm thick Cr film was formed on the glass disk by sputtering. When a CoCrTa magnetic thin film is formed on the Cr film, as will be described, the latter serves to make the crystallines of the latter dense to thereby enhance the magnetic characteristic of the latter. The magnetic thin film or magnetic medium CoCrTa was formed on the Cr film to a thickness of 50 nm. The Cr film and CoCrTa film were each formed at an Ar discharge gas pressure of 30 mTorr and a sputter power density of 8.5 W/cm². Embodiments and Comparative Embodiments thereof which will be described are identical regarding the structure extending from the glass substrate to the magnetic medium.

Table 1 shown below, lists the kinds and thicknesses of protection films and lubrication films representative of Embodiments arid Comparative Embodiments.

TABLE 1

| SAMPLE | PROTECTIVE FILM | FILM THICKNESS | LUBRICATION FILM | FILM THICKNESS |
|---|---|---|---|---|
| EMBOD 1 | sputtered carbon | 10 nm | C60 | 3 nm |
| EMBOD 2 | " | 10 nm | C70 | 3 nm |
| EMBOD 3 | " | 10 nm | C84 | 3 nm |
| EMBOD 4 | " | 10 nm | C60-AL | 3 nm |
| EMBOD 5 | " | 10 nm | C60-AM | 3 nm |
| EMBOD 6 | " | 10 nm | C60-PH | 3 nm |
| EMBOD 7 | sputtered SiO₂ | 10 nm | C60 | 3 nm |
| EMBOD 8 | " | 10 nm | C70 | 3 nm |
| EMBOD 9 | " | 10 nm | C84 | 3 nm |
| EMBOD 10 | " | 10 nm | C60-AL | 3 nm |
| EMBOD 11 | " | 10 nm | C60-AM | 3 nm |
| EMBOD 12 | " | 10 nm | C60-PH | 3 nm |
| EMBOD 13 | sputtered Si | 10 nm | C60 | 3 nm |
| EMBOD 14 | " | 10 nm | C70 | 3 nm |
| EMBOD 15 | " | 10 nm | C84 | 3 nm |
| EMBOD 16 | " | 10 nm | C60-AL | 3 nm |
| EMBOD 17 | " | 10 nm | C60-AM | 3 nm |
| EMBOD 18 | " | 10 nm | C60-PH | 3 nm |
| EMBOD 19 | sputtered Rh | 10 nm | C60 | 3 nm |
| EMBOD 20 | " | 10 nm | C70 | 3 nm |
| EMBOD 21 | " | 10 nm | C84 | 3 nm |
| EMBOD 22 | " | 10 nm | C60-AL | 3 nm |
| EMBOD 23 | " | 10 nm | C60-AM | 3 nm |
| EMBOD 24 | " | 10 nm | C60-PH | 3 nm |
| EMBOD 25 | absent | | C60 | 5 nm |
| EMBOD 26 | " | | C70 | 5 nm |
| EMBOD 27 | " | | C84 | 5 nm |
| EMBOD 28 | " | | C60-AL | 5 nm |
| EMBOD 29 | " | | C60-AM | 5 nm |
| EMBOD 30 | " | | C60-PH | 5 nm |
| EMBOD 31 | thermal oxidized layer | 10 nm | C60 | 4 nm |
| EMBOD 32 | thermal oxidized layer | 10 nm | C70 | 4 nm |
| EMBOD 33 | thermal oxidized layer | 10 nm | C84 | 4 nm |
| EMBOD 34 | thermal oxidized layer | 10 nm | C60-AL | 4 nm |
| EMBOD 35 | thermal oxidized layer | 10 nm | C60-AM | 4 nm |
| EMBOD 36 | thermal oxidized layer | 10 nm | C60-PH | 4 nm |
| COMPAR | | | | |
| EMBOD 1 | sputtered carbon | 10 nm | liquid | 2 nm |
| EMBOD 2 | " | 20 nm | " | 2 nm |

In Embodiment 1, a 10 nm thick carbon film was formed by sputtering at an Ar discharge gas pressure of 20 mTorr and a sputter power density of 17 W/cm². Further, a C60 film was formed on the carbon film to a thickness of 3 nm (corresponding to about three molecule layers).

FIG. 1 is a fragmentary section of a magnetic disk produced by any one of Embodiments 1-24. As shown, the disk has a substrate 1 and a magnetic medium layer 2. A protection layer 3 is implemented as a sputtered carbon film in Embodiments 1-6, sputtered SiO² in Embodiments 7-12, sputtered Si in Embodiments 13-18, and sputtered Rh in Embodiments 19-24. The reference numeral 4 designates a lubrication layer constituted by a particular material in each Embodiment.

Figure 2:
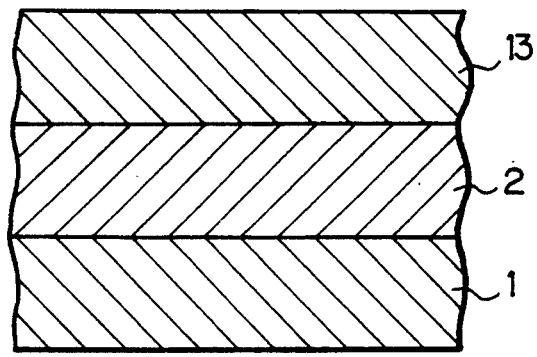
FIG. 2 is a view similar to FIG. 1, showing a magnetic disk produced by any one of Embodiments 25–30.

FIG. 2 shows a disk derived from any one of Embodiments 25-30 in a fragmentary cross section. As shown, Embodiments 25-30 each includes a fullerene-based solid lubrication film 13 having a thickness of 3 nm and directly formed on the CoCrTa magnetic medium 2.

Figure 3:
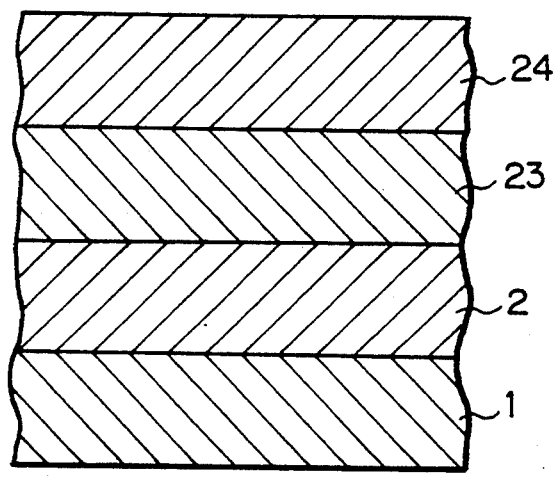
FIG. 3 is a view also similar to FIG. 1, showing a magnetic disk produced by any one of Embodiments 31–36.

FIG. 3 is a fragmentary section of a magnetic disk produced by any one of Embodiments 31-36. As shown, the disk includes an oxidized protection film 23 formed by heating the surface layer of the CoCrTa magnetic medium 2, and then providing a 4 nm thick fullerene-based solid lubrication layer 24 on the protection layer 23. After the CoCrTa film has been formed, the disk was exposed to a pure $O_2$ atmosphere for 2 hours to form a 10 nm thick surface oxidized layer 23.

Figure 4:
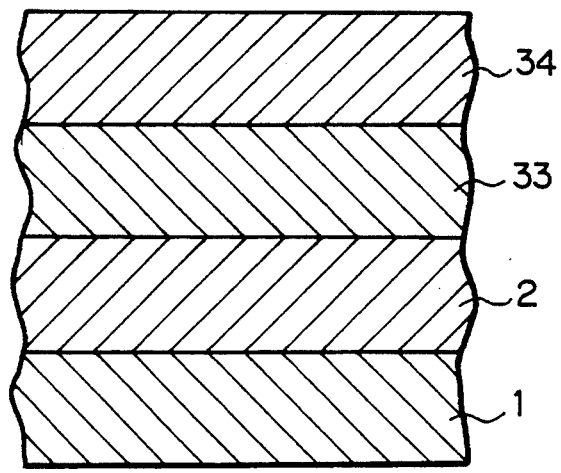
FIG. 4 is a fragmentary section showing a magnetic disk produced by either of Comparative Embodiments 1 and 2.

As shown in FIG. 4, Comparative Embodiments 1 and 2 have respectively a 10 nm thick and a 20 nm thick sputtered carbon film on protection layers 33. In each of Comparative Embodiments 1 and 2, the carbon film is covered with a 2 nm thick liquid lubricant 34 which belongs to a group of organic fluorides. Since the glass substrates 1 of these Comparative Embodiments are implemented with a liquid lubricant, a texture for preventing a slider from sticking is provided. The disk has greater surface roughness than the disks of Embodiments.

A contact start and stop (CSS) test which is a typical mechanical durability test was conducted with each of the disks produced by Embodiments and Comparative Embodiments. The disks of Embodiments 1–36 all endured more than 100,000 times of CSS test. By contrast, the disk of Comparative Example 1 had the surface thereof damaged by friction when the CSS test was repeated about 50,000 times and was found unable to record or reproduce data. Although the disk of Comparative Embodiment 2 endured about 100,000 times of CSS test, some scratches were found. Regarding the linear recording density measured on a D50 basis, the disks of Embodiments 1–36 were 80 Kbpi to 120 Kbpi while the disks of Comparative Examples were 60 Kbpi to 80 Kbpi. With the present invention, therefore, there can be achieved high density recording. Presumably, the enhanced recording density is derived from the combined effect of the thinner protection film and the absence of a texture.

In summary, it will be seen that the present invention provides a magnetic recording medium having unprecedented mechanical durability and high recording density.

Various modifications will become possible for those skilled in the art after receiving the teachings of the present disclosure without departing from the scope thereof,

What is claimed is:

1. A magnetic recording medium comprising:
   a substrate,
   a magnetic medium,
   a protection film, and
   a solid lubrication layer,
which are sequentially formed on said substrate in this order, and wherein said solid lubrication layer comprises an alkyl or allyl-chained fullerene.

2. A medium as claimed in claim 1, wherein said protective layer comprises a film of nonmagnetic metal, nonmagnetic oxide, nonmagnetic nitrite, or nonmagnetic carbon.

3. A magnetic recording medium comprising:
   a substrate,
   a magnetic medium, and
   a solid lubrication layer,
which are sequentially formed on said substrate in this order, and wherein said solid lubrication layer comprises an alkyl or allyl-chained fullerene.

4. A magnetic recording medium comprising:
   a substrate,
   a magnetic medium,
   a layer formed by oxidizing a surface of said magnetic medium by heat, and
   a solid lubrication layer,
which are sequentially formed on said substrate in this order, and wherein said solid lubrication layer comprises an alkyl or allyl-chained fullerene.

* * * * *

UNITED STATES PATENT AND TRADEMARK OFFICE
CERTIFICATE OF CORRECTION

PATENT NO.   : 5,447,796
DATED        : September 5, 1995
INVENTOR(S)  : Yuji TSUKAMOTO et al.

It is certified that error(s) appears in the above-identified patent and that said Letters Patent is hereby corrected as shown below:

Col. 1, line 28, delete "the" (second occurrence).

Col. 4, line 3, delete "arid" and insert --and--.

Signed and Sealed this

Twentieth Day of February, 1996

Attest:

BRUCE LEHMAN

*Attesting Officer*   *Commissioner of Patents and Trademarks*